Dec. 31, 1957  A. J. ROSENTHAL  2,818,133
SOLVENT RECOVERY
Filed Nov. 4, 1955
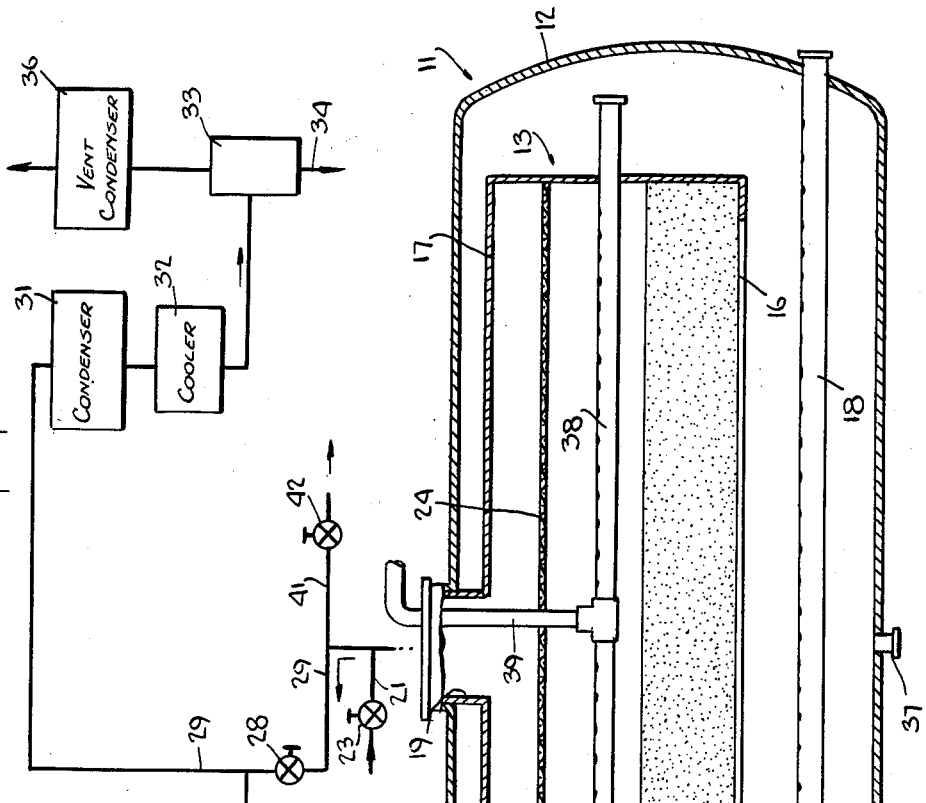
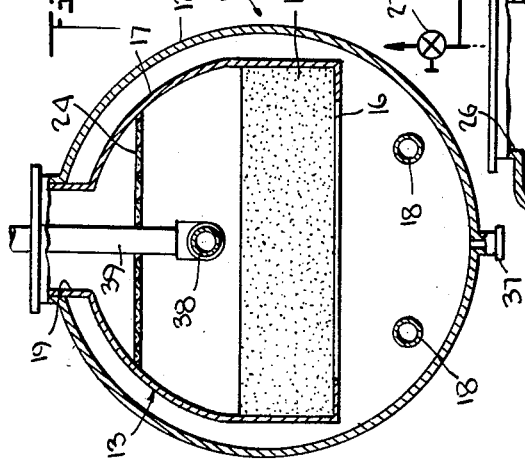
INVENTOR.
ARNOLD J. ROSENTHAL
BY
ATTORNEYS United States Patent Office 2,818,133
Patented Dec. 31, 1957

2,818,133
SOLVENT RECOVERY

Arnold J. Rosenthal, Hanover, N. J., assignor to Celanese Corporation of America, New York, N. Y., a corporation of Delaware Application November 4, 1955, Serial No. 544,978

10 Claims. (Cl. 183—4.5)

This invention relates to solvent recovery and relates more particularly to the recovery of solvents by the use of an adsorbent bed.

In one method of solvent recovery commonly employed in the art, vapor-laden air, that is, air carrying vapors of the solvent which is to be recovered, is passed through an adsorber containing a bed of adsorbent material, such as carbon, which removes the solvent from the air. Thereafter, the bed is steamed to drive out the solvent which has been adsorbed thereon and the resulting mixture of steam and solvent vapors is passed through a condenser where the solvent is liquefied and separated. When the conventional adsorption systems are used for certain solvents, such as methylene chloride, it is found that the overall capacity for removal of solvent is not as high as desired.

It is therefore an object of this invention to provide a new and improved adsorption system, wherein by a simple modification of existing adsorption systems, the capacity of said systems may be increased appreciably.

Other objects of this invention will be apparent from the following detailed description and claims.

I have found that the presence of a considerable amount of air in the adsorber at the beginning of the steaming operation greatly decreases the adsorption capacity of the system. Thus, during the initial portion of the steaming cycle the mixture coming from the adsorber is primarily air and solvent. It is difficult to remove this solvent from the air unless the condenser is operated at an undesirably low temperature. Of course, any uncondensed solvent is not lost but is instead recycled to the adsorber, but it will be apparent that this recycling decreases the capacity of the adsorber for recovering freshly introduced solvent.

As indicated above, one method of increasing the recovery of solvent is to lower the temperature in the condenser. However, on an industrial scale this would require the installation of additional expensive refrigeration equipment. As an alternative, the entire system may be placed under superatmospheric pressure during the steaming cycle, but this necessitates higher steaming temperatures which have a detrimental effect on certain solvents such as methylene chloride.

In accordance with one aspect of this invention a substantial part of the air in the adsorber may be removed by introducing steam into the adsorber at a zone displaced from the bed of adsorbent material and flowing said steam from said zone in a direction away from said bed so as to displace the air in said adsorber. After the air is displaced, the steam is passed through the bed of adsorbent material in the conventional manner to remove the solvent therefrom. By modifying existing adsorption systems in accordance with this invention, the capacity of said systems for adsorbing solvents such as methylene chloride has been increased appreciably without the necessity of changing the condenser temperatures or pressures.

In the accompanying drawing, which illustrates one form of the invention,

Fig. 1 is a diagrammatic view of the adsorption system, showing a side view of the adsorber in cross-section, and Fig. 2 is an end view of the adsorber in cross-section.

Like reference numerals designate like parts in both views of the drawing.

Referring now to the drawing, reference numeral 11 designates generally an adsorber having an outer fluid-tight shell 12 within which there is mounted a basket 13 supporting and enclosing a bed 14 of adsorbent carbon. The basket 13 consists of a foraminous bottom grating 16, on which the bed 14 rests, and a fluid-tight canopy 17, generally semi-cylindrical in shape, covering the entire bed. A pair of steam spargers 18 is mounted below the grating 16, while a duct 19 passes through the shell 12 and into the top of the canopy 17.

In the conventional adsorber, vapor-laden air is admitted to the duct 19 from a conduit 21 through a valve 23, passes down through a screen 24 which serves as an air diffuser and then through the bed 14 of carbon which adsorbs the solvent. After passing through the bed 14, the air flows through the grating 16 and then upward around the canopy 17 to an exhaust opening 26 and out to the atmosphere through a valve 27. After a certain period of adsorption, but generally prior to complete saturation of the bed with solvent, the flow of air is stopped by closing the valves 23 and 27. Steam is then introduced through the spargers 18 and at the same time a valve 28 in a conduit 29 leading to a condenser 31 is opened. The steam passing upward through the bed of carbon 14 heats said bed and drives the solvent therefrom. The resulting mixture of steam and solvent flows through the duct 19, the valve 28 and the conduit 29 to the condenser 31, where most of the solvent is liquefied, then through a cooler 32 for reducing the temperature of the condensate to a gas separator 33, from which the condensate is decanted through a line 34. The uncondensed gas flows upward from the separator 33, past a vent condenser 36, any solvent vapor in said gas being recovered by recycling said gas, as by mixing it with other vapor-laden air and passing it again through the adsorber 11, or a similar adsorber, at the appropriate stage of operation.

The canopy 17 serves to shield the bed 14 from the water which is formed when the steam condenses on the walls of the shell 12 and which would otherwise drip onto the bed 14. This water collects at the bottom of the shell 12 and is removed through a drain 37. As is common in the art, other drain means (not shown), are provided for collecting and carrying away any condensate forming in the duct 19. The canopy 17 also serves to protect the shell 12 from contact with the frequently corrosive mixture of steam and solvent.

In accordance with one aspect of the present invention, the adsorber 11 is modified by the addition of a steam sparger 38 above the bed 14. Steam, admitted to this upper sparger 38 through a central pipe 39 which passes through the duct 19, serves to drive the air from the space above the bed 14 at the beginning of the steaming cycle. This air, mixed with the steam and with a small amount of solvent, flows through the valve 28 and the conduit 29 to the condenser 31, or may, if desired, be vented to the atmosphere through another branch 41 and a valve 42. At the same time steam is admitted to the lower spargers 18 and a valve 43 in a line 44 leading from the exhaust opening 27 to the conduit 29 is opened. Accordingly, the air which is within the shell 12 but outside the canopy 17 is displaced by the steam entering from the lower spargers 18 and the resulting mixture of air, steam and a small amount of solvent passes through the valve 43 to the condenser 31.

After the brief period necessary to drive off the air, the supply of steam to the upper sparger 38 is shut off and the valve 43 is closed while the flow of steam from the lower spargers 18 continues so that the remainder of the steaming operation to remove solvent from the bed 14 is conducted in the conventional manner. On the completion of the steaming operation the cycle of adsorption and steaming is begun again.

It is to be understood that the foregoing detailed description is given merely by way of illustration and that many variations may be made therein without departing from the spirit of my invention.

Having described my invention what I desire to secure by Letters Patent is:

1. An adsorber for recovering solvent from mixtures of solvent vapors and air, comprising a vessel and a bed of adsorbent material supported in said vessel, a basket supporting said bed in horizontal spaced relation with the walls of said vessel and including a foraminous under-support for said bed, a fluid-tight canopy connected to said under-support and forming a closed gas space above said bed, inlet means for the air-solvent mixture to be treated for adsorption of said solvent by said bed, said inlet means communicating with the interior of said canopy above said bed and an outlet for the treated air outside of said canopy, and means for introducing steam into said vessel at a zone spaced from said bed and for moving said steam from said zone in a direction away from said bed so as to displace air from said vessel at one period of time and for passing steam through said bed to remove the solvent therefrom at a subsequent period of time, the construction and arrangement being such that the steam introduced for displacing the air from said vessel does not pass through a solvent-laden bed of adsorbent material.

2. An adsorber for recovering solvent from mixtures of solvent vapors and air, comprising a vessel and a bed of adsorbent material supported in said vessel, means for introducing a mixture of air and solvent vapor into said vessel so as to pass through said bed for adsorption of said solvent by said bed, and means for introducing steam into said vessel at a zone spaced from said bed and for moving said steam from said zone in a direction away from said bed so as to displace air from said vessel at one period of time and for passing steam through said bed to remove the solvent therefrom at a subsequent period of time, the construction and arrangement being such that the steam introduced for displacing the air from said vessel does not pass through a solvent-laden bed of adsorbent material.

3. An adsorber for recovering solvent from mixtures of solvent vapors and air, comprising a vessel and a bed of adsorbent material supported in said vessel, a basket supporting said bed in horizontal spaced relation with the walls of said vessel and including a foraminous under-support for said bed, a fluid-tight canopy connected to said under-support and forming a closed gas space above said bed, inlet means for the air-solvent mixture to be treated for adsorption of said solvent by said bed, said inlet means communicating with the interior of said canopy above said bed and an outlet for the treated air outside of said canopy, and means for introducing steam into said vessel at a zone spaced from said bed and for moving said steam from said zone in a direction away from said bed so as to displace air from said vessel, said steam-introducing means comprising duct means for delivering steam within said canopy at a point above said bed at one period of time and for passing steam through said bed to remove the solvent therefrom at a subsequent period of time, the construction and arrangement being such that the steam introduced for displacing the air from said vessel does not pass through a solvent-laden bed of adsorbent material.

4. An adsorber for recovering solvent from mixtures of solvent vapors and air, comprising a vessel and a bed of adsorbent material supported in said vessel, means for introducing a mixture of air and solvent vapor into said vessel so as to pass through said bed for adsorption of said solvent by said bed, and means for introducing steam into said vessel at a zone spaced from said bed and for moving said steam from said zone in a direction away from said bed so as to displace air from said vessel at one period of time and for passing steam through said bed to remove the solvent therefrom at a subsequent period of time, said steam-introducing means comprising duct means for delivering steam within said canopy at points above and below said bed, the construction and arrangement being such that the steam introduced for displacing the air from said vessel does not pass through a solvent-laden bed of adsorbent material.

5. An adsorber for recovering solvent from mixtures of solvent vapors and air, comprising a vessel and a bed of adsorbent material supported in said vessel, means for introducing a mixture of air and solvent vapor into said vessel so as to pass through said bed for adsorption of said solvent by said bed, means for introducing steam into said vessel at a zone spaced from said bed and for moving said steam from said zone in a direction away from said bed so as to displace air from said vessel at one period of time and for passing steam through said bed to remove the solvent therefrom at a subsequent period of time, and a cooled condenser receiving the resulting mixture of solvent and steam, the construction and arrangement being such that the steam introduced for displacing the air from said vessel does not pass through a solvent-laden bed of adsorbent material.

6. Process for solvent recovery comprising passing a mixture of air and vaporized solvent through a vessel containing a bed of adsorbent material whereby to absorb said solvent in said bed, introducing steam in said vessel at a zone spaced from said bed and flowing said steam from zone in a direction away from said bed so as to displace air from said vessel, and then flowing steam through said bed to remove adsorbed solvent therefrom, and removing the resulting mixture of steam and solvent from said vessel, the process being carried out in such a manner that the steam introduced for displacing the air from said vessel does not pass through a solvent-laden bed of adsorbent material.

7. Process for solvent recovery comprising passing a mixture of air and vaporized methylene chloride through a vessel containing a bed of adsorbent carbon whereby to adsorb methylene chloride in said bed, introducing steam in said vessel at a zone spaced from said bed and flowing said steam from zone in a direction away from said bed so as to displace air from said vessel, and then flowing steam through said bed to remove adsorbed methylene chloride therefrom, removing the resulting mixture of steam and methylene chloride from said vessel, and passing said mixture through a cooled condenser to liquefy said methylene chloride, the process being carried out in such a manner that the steam introduced for displacing the air from said vessel does not pass through a solvent-laden bed of adsorbent material.

8. Process for solvent recovery comprising passing a mixture of air and solvent vapors through a vessel containing a bed of adsorbent material whereby to adsorb said solvent in said bed, said bed being mounted on a foraminous under-support and in horizontal spaced relation with the walls of said vessel and being covered by a fluid-tight canopy connected to said under-support and forming a closed gas space above said bed, said mixture of air and solvent being introduced into the interior of said canopy above said bed, introducing steam into the interior of said canopy above said support in such a manner as to displace air away from said bed and thereafter passing steam upwardly through said bed to remove solvent from said bed, the process being carried out in such a manner that the steam introduced for displacing the air from said vessel does not pass through a solvent-laden bed of adsorbent material.

9. Process for solvent recovery comprising passing a mixture of air and solvent vapors through a vessel containing a bed of adsorbent carbon whereby to adsorb solvent in said bed, said bed being mounted on a foraminous under-support and in horizontal spaced relation with the walls of said vessel and being covered by a fluid-tight canopy connected to said under-support and forming a closed gas space above said bed, said mixture of air and solvent being introduced into the interior of said canopy above said bed, introducing steam into the interior of said canopy above said support in such a manner as to displace air away from said bed and simultaneously introducing steam into said vessel below said bed in such a manner as to displace air in said vessel and outside of said canopy away from said bed and thereafter passing steam upwardly through said bed to remove solvent from said bed, the process being carried out in such a manner that the steam introduced for displacing the air from said vessel does not pass through a solvent-laden bed of adsorbent material.

10. Process for solvent recovery comprising passing a mixture of air and vaporized methylene chloride through a vessel containing a bed of adsorbent carbon whereby to adsorb methylene chloride in said bad, said bed being mounted on a foraminous under-support and in horizontal spaced relation with the walls of said vessel and being covered by a fluid-tight canopy connected to said under-support and forming a closed gas space above said bed, said mixture of air and methylene chloride being introduced into the interior of said canopy above said bed, introducing steam into the interior of said canopy above said support in such a manner as to displace air away from said bed and simultaneously introducing steam into said vessel below said bed in such a manner as to displace air in said vessel and outside of said canopy away from said bed and thereafter passing steam upwardly through said bed to remove methylene chloride from said bed and passing the resulting mixture of steam and methylene chloride through a cooled condenser to liquefy said methylene chloride, the process being carried out in such a manner that the steam introduced for displacing the air from said vessel does not pass through a solvent-laden bed of adsorbent material.

References Cited in the file of this patent

UNITED STATES PATENTS

| | | |
|---|---|---|
| 1,616,242 | Voress et al. | Feb. 1, 1927 |
| 1,875,199 | Parkman | Aug. 30, 1932 |
| 2,180,712 | Logan | Nov. 21, 1939 |
| 2,413,771 | Luaces | Jan. 7, 1947 |

FOREIGN PATENTS

| | | |
|---|---|---|
| 477,657 | Great Britain | Jan. 4, 1938 |